(12) United States Patent
Summers et al.

(10) Patent No.: US 6,360,426 B1
(45) Date of Patent: Mar. 26, 2002

(54) METHOD OF MAKING WIRELESS SUSPENSIONS WITH ALIGNMENT FEATURE

(76) Inventors: Robert Summers; Amanullah Khan, both of 26201 Ynez Rd., Ste. 104, Temecula, CA (US) 92591

( * ) Notice: Subject to any disclaimer, the term of this patent is extended or adjusted under 35 U.S.C. 154(b) by 0 days.

(21) Appl. No.: 09/439,578

(22) Filed: Nov. 12, 1999

Related U.S. Application Data

(60) Provisional application No. 60/154,666, filed on Sep. 16, 1999.

(51) Int. Cl.[7] .................................................. G11B 5/42
(52) U.S. Cl. ................................ 29/603.03; 29/603.06; 29/407.1
(58) Field of Search ........................ 29/603.03, 603.04, 29/603.05, 603.06, 407.1

(56) References Cited

U.S. PATENT DOCUMENTS 6,134,770 A * 10/2000 Heeren et al. ........... 29/603.03

* cited by examiner

*Primary Examiner*—Carl E. Hall

(57) ABSTRACT

Disk drive suspension load beam and flexible circuit components are juxtaposed and properly located relative to each other before welding by a series of areally distributed locator structures that intersect across the common plane between the components in aligning relation.

17 Claims, 4 Drawing Sheets

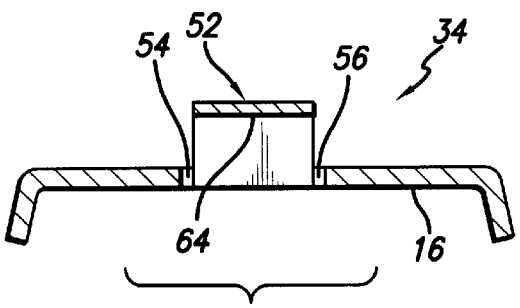
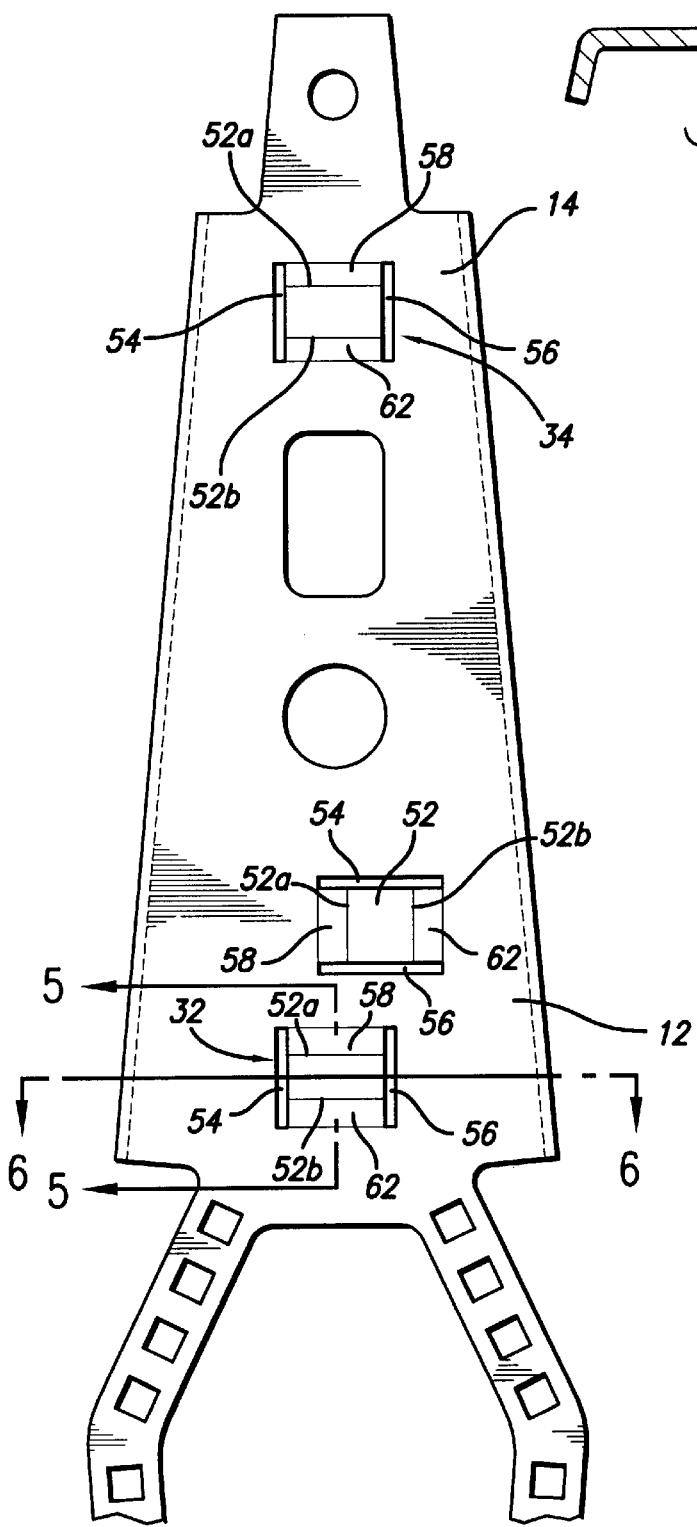
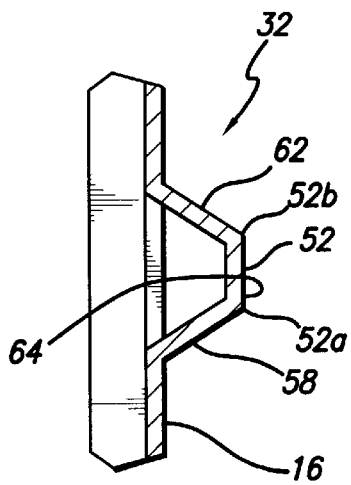

METHOD OF MAKING WIRELESS SUSPENSIONS WITH ALIGNMENT FEATURE

REFERENCE TO RELATED APPLICATION

This application claims the benefit of United States Provisional Application Serial No. 60/154,666 filed Sep. 16, 1999.

BACKGROUND OF THE INVENTION

1. Field of the Invention

This invention relates to disk drive suspensions, and, more particularly, to wireless disk drive suspensions in which the electrical conductor comprises a flexible circuit laminate of trace conductors, an insulative plastic film, and a support such as a stainless steel layer. The invention further relates to an improved method for the assembly of such suspensions including improvements in lowering of capital equipment costs, in speed and accuracy of positioning and in the maintenance of the accurate position before and during welding. In the invention, the alignment of the parts is with reference to themselves, and does not depend on the accuracy of a machine vision apparatus. The invention particularly concerns the use of cooperating mechanical locators areally distributed on the load beam and the flexible circuit and extending through the common plane between them to enable the rapid, correct placement of the flexible circuit on the load beam.

2. Related Art

Disk drive suspensions are quite small and the attachment thereto of the wireless electrical conductor is problematical. The components are spot-welded but must be first aligned with as perfect a registration as possible. Machine vision relies on markers to read the position of the load beam in a welding fixture and through X, Y movements places the wireless laminate as desired. This is a slow process and only as accurate as the machine precision in reading of the markers will allow. In addition, the accompanying fixturing is typically quite costly, and, since many suspension runs are small, there is a relatively large capital charge on every part made in these runs. Further, present systems are deficient in maintaining the desired alignment, once achieved, until welding is effected. Relative movement of the parts will detract from the accuracy of the result although the alignment was perfect.

SUMMARY OF THE INVENTION

It is an object of the invention, therefore, to provide a method for the assembly of disk drive suspension components. It is a further object to achieve their proper alignment without use of machine vision. It is a further object to maintain the aligned parts free of relative movement until welded or otherwise fixed together. Yet another object is to have the parts physically modified such that they will self-align solely by reference to themselves. It is a further object to provide a disk drive suspension comprising load beam and flexible circuit components having the noted features.

These and other objects to become apparent hereinafter are realized in the invention method of assembling in a predetermined alignment the load beam and flexible circuit components of a disk drive suspension having proximate and distal ends that includes juxtaposing at a common contact plane a suspension load beam having a longitudinal axis and a flexible circuit having a longitudinal axis, the flexible circuit comprising a laminate of trace conductors, an insulative film and a metal support layer engaging the load beam in the contact plane, intersecting longitudinally spaced first and second locator structures on the load beam with longitudinally spaced third and fourth locator structures on the flexible circuit across the common contact plane to locate the load beam and flexible circuit in the predetermined alignment, and thereafter fixing the load beam and flexible circuit together in the predetermined alignment In this and like embodiments, typically, the method further includes extending the first and second locator structures through the common plane, and receiving the first and second locator structures with the third and fourth locator structures respectively, welding the flexible circuit metal layer to the load beam in locations spaced from the locator structures, locating the first and second locator structures at the suspension distal end, locating the third and fourth locator structures at the suspension proximate end, also forming in the load beam longitudinally spaced and axially aligned raised sections raised out of the general plane of the load beam, orienting the raised load beam sections normal to the longitudinal axis of the load beam, forming raised section receiving recesses in the flexible circuit metal layer to form the second and fourth locator structures, and also selecting a stainless steel metal layer, and intersecting fifth and sixth locator structures on the load beam and flexible circuit respectively across the common contact plane simultaneously with intersecting of the first through fourth locator structures, the fifth and sixth locator structures being laterally offset from the longitudinal axes of the load beam and flexible circuit.

In a further embodiment, the invention assembly method also includes extending the first through sixth locator structures through the common plane, and receiving the first, second and fifth locator structures with the third, fourth and sixth locator structures respectively.

In this and like embodiments, typically, there is further included welding the flexible circuit metal layer to the load beam in locations spaced from the locator structures, locating the first and third locator structure at the suspension distal end, locating the second, fourth and fifth and sixth locator structures at the suspension proximate end, forming in the load beam longitudinally spaced and axially aligned raised sections raised out of the general plane of the load beam as the first, second and fifth locator structures, orienting the raised load beam sections of the first and third locator structures normal to the longitudinal axis of the load beam, and orienting the fifth locator structure parallel to the longitudinal axis, and forming raised section receiving recesses in the metal layer to form the second, fourth and sixth locator structures, the recesses extending through the metal layer, the fifth and sixth locators being paired and located between the first and second paired locators and the third and fourth paired locators.

The invention further provides a disk drive suspension having proximate and distal ends and comprising a load beam and a flexible circuit laminate of trace conductors, an insulative film and a metal layer, the load beam and flexible circuit being fixed together on either side of a common plane, plural pairs of interfitting locator structures including a distal pair of first and second locator structures, a first proximate pair of third and fourth locator structures, and a second proximate pair of fifth and sixth locator structures, the first and second pairs being located on the longitudinal axes of the load beam and flexible circuit, the third pair being located laterally offset from longitudinal axes and between the first and second pairs at the proximate end of the suspension, the pair members being interfitting in common plane intersecting relation.

In this and like embodiments, typically, the first, second and third pairs of locator structures each comprise a raised metal section and a recessed metal section opposed across the common plane, the raised metal sections are each formed in the load beam as a load beam section raised out of the general plane of the load beam, the recessed metal sections are each formed of the metal layer, the raised metal sections are each formed in the load beam as a load beam section spaced from the general plane of the load beam, and the recessed metal sections include a recess extending through the metal layer.

BRIEF DESCRIPTION OF THE DRAWINGS

The invention will be further described in conjunction with the attached drawings in which:

FIG. 1A is a view taken on line 1A—1A in FIG. 1.

FIG. 4 is front side plan view of the suspension;

FIG. 5 is a view taken on line 5—5 in FIG. 4; and

FIG. 6 is a view taken on line 6—6 in FIG. 4.

DETAILED DESCRIPTION

Figure 1:
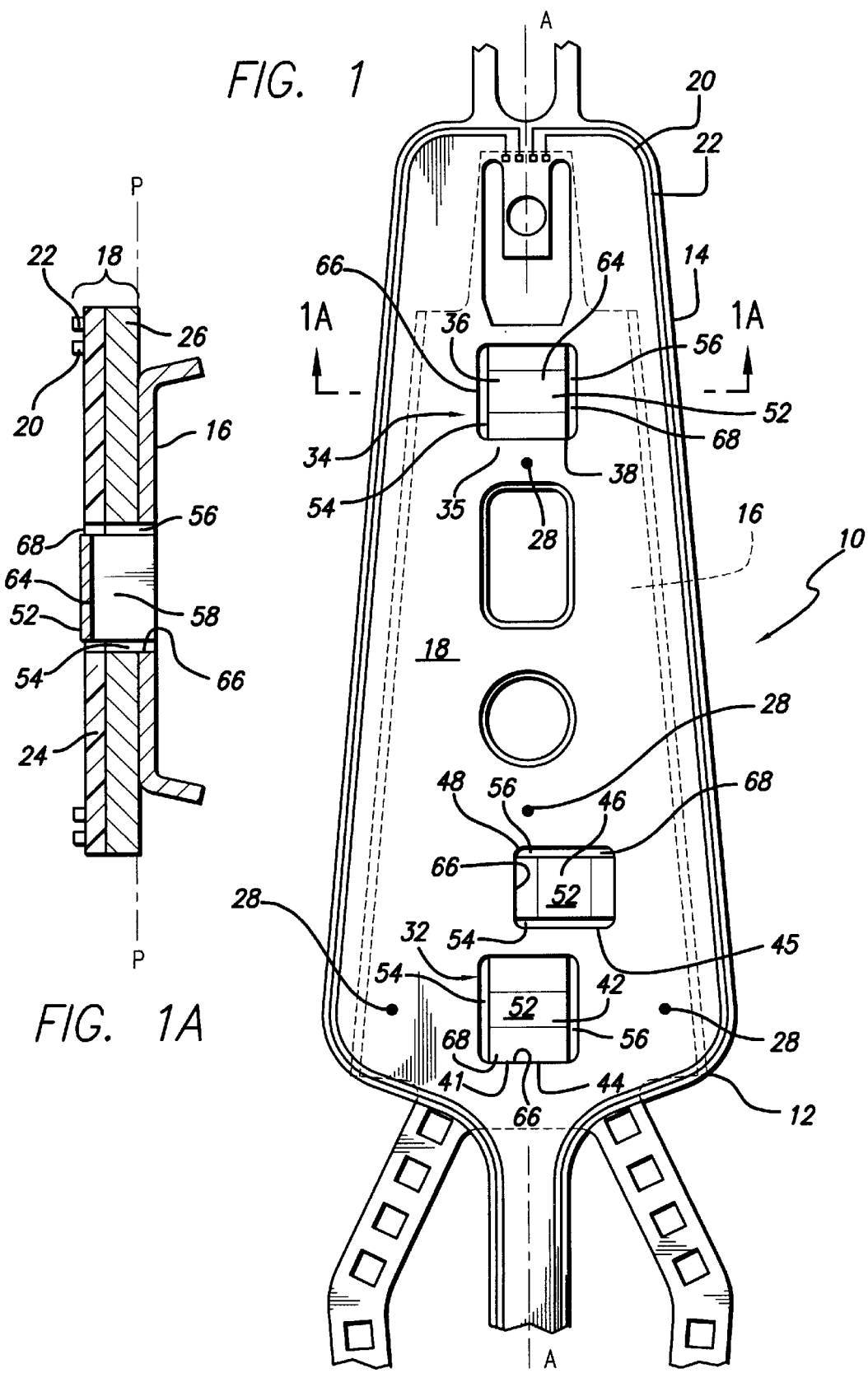
FIG. 1 is a back side plan view of the invention suspension.
Figure 2:
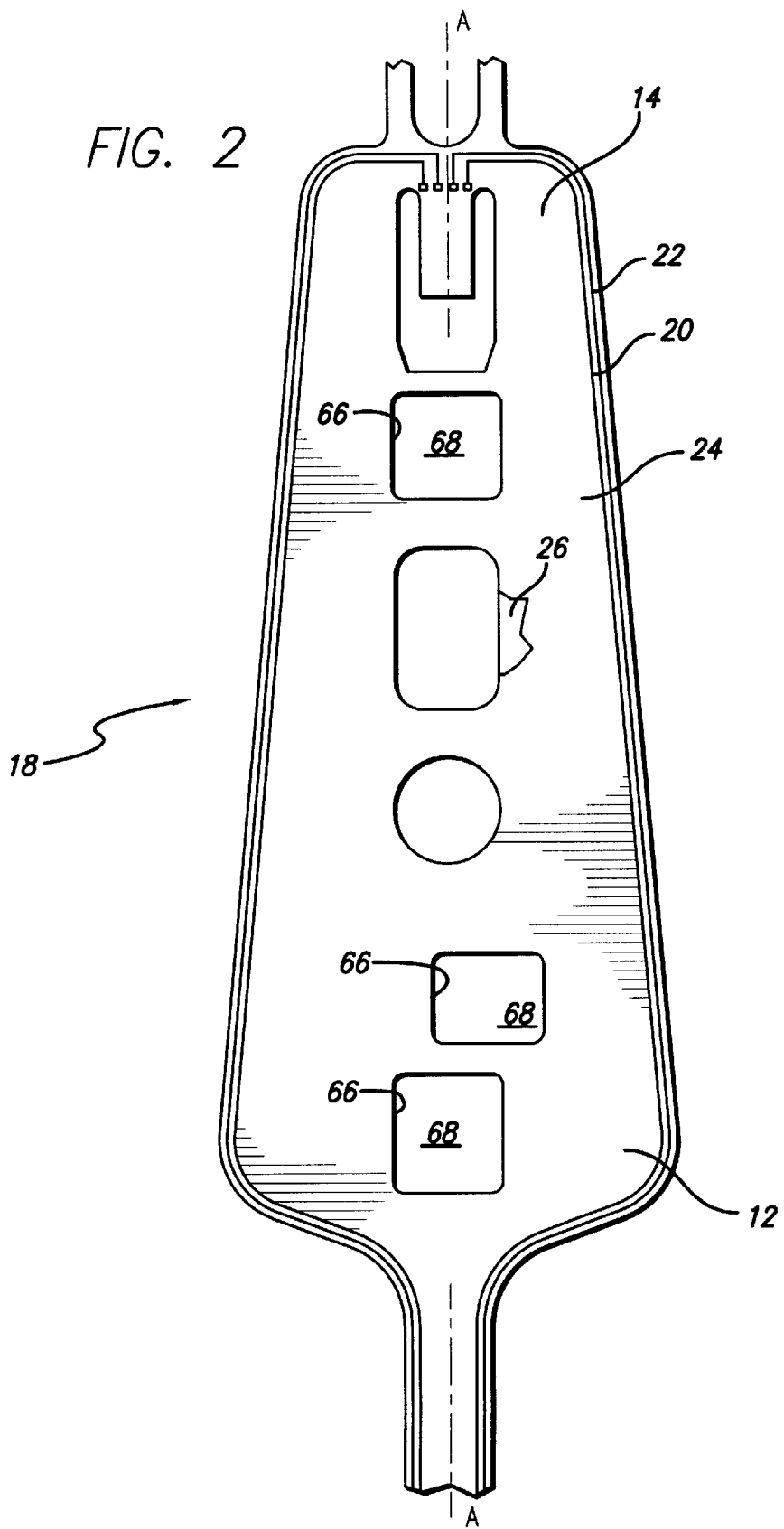
FIG. 2 is a back side plan view of the flexible circuit component of the suspension.

With reference now to the drawings in detail, in FIGS. 1–4, the invention disk drive suspension 10 has a proximate end 12 and a distal end 14. The suspension 10 comprises load beam 16 and a flexible circuit 18, a laminate of trace conductors 20, 22, an insulative plastic film layer 24 and a metal layer 26. The load beam 16 and flexible circuit 18 are fixed together by weld points 28 to be at either side of a common plane P—P that lies between them. A series of locator structures 32, 34 are formed on the opposing load beam 16 and flexible circuit 18.

Locator structures 32, 34 include a first distal pair 35 of first and second locator structures 36, 38, a first proximate pair 41 of third and fourth locator structures 42, 44, and a second proximate pair 45 of fifth and sixth locator structures 46, 48.

First and second pairs 35, 41 of locator structures 36, 38, 42, 44 are located on the coincident longitudinal axes A—A of the load beam 16 and flexible circuit 18. The second proximate pair 45 (third pair overall) of locator structures 46, 48 are located laterally offset from the longitudinal axes A—A and between the first and second pairs 35, 41 at the proximate end 12 of the suspension 10.

The several pair members 36, 38, and 42, 44 and 46, 48 are male-female pairs and interfit in the assembled condition of the suspension 10. Their interfittment is across and intersects the common plane P—P.

Figure 3:
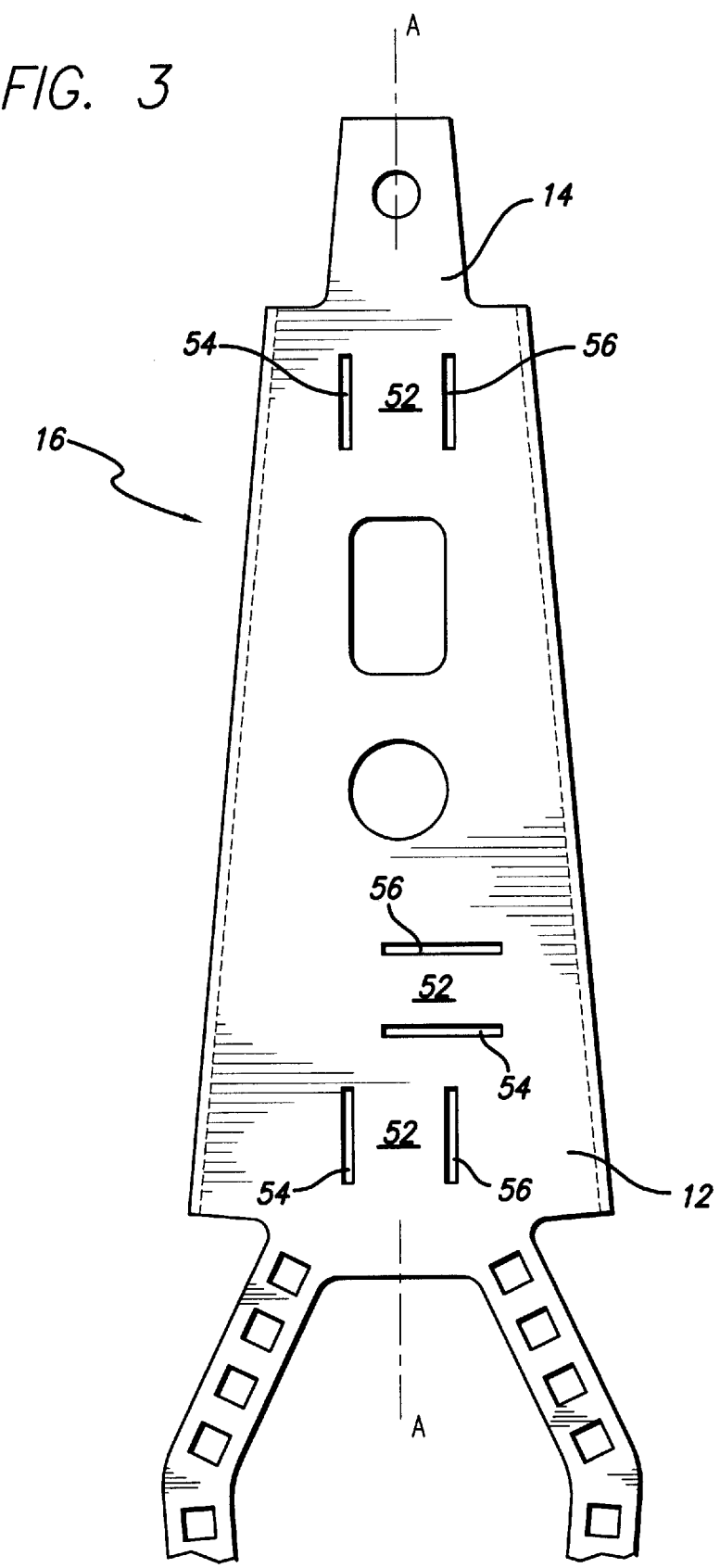
FIG. 3 is a back side plan view of the load beam component of the suspension.

Typically, and with reference to FIGS. 5 and 6 as well as FIGS. 1–4, the first, second and third pairs 35, 41 and 45 of locator structure members 36, 38, 42, 44 and 46, 48 each comprise a raised metal section 52, each formed in the load beam 16 as a load beam section raised out of the general plane of the load beam formed by locally upsetting the metal. Initially, gaps 54, 56 are formed by etching the load beam 16. The orientation of gaps 54, 56 will determine the orientation of the raised section 52. In FIG. 3, the gaps 54, 56 are parallel or perpendicular to the longitudinal axis of the load beam 16. The raised portion 52 between the gaps 54, 56 is deflected out of the load beam plane sufficiently to penetrate and cross the common plane P—P when the load beam 16 and the flexible circuit 18 are placed in face-to-face engagement, FIG. 1A. As best shown in FIG. 4 the raised section 52 typically has fold lines 52a, 52b that provide a transition from the sloping portions 58, 62 of the section sloping from the load beam 16 upward and inward as shown to the section topmost portion 64 that is parallel to the load beam general plane, as best shown in FIG. 5. In FIG. 6, the view is at a right angle to the view in FIG. 5 and the gaps 52, 54 are best shown. The isolated section 52 between gaps 54, 56 is typically raised about 0.003 inch from the general plane of the load beam 16.

Pairs 35, 41 and 45 further include a recessed metal section 66 opposed to and registered with the raised metal section 52 across the common plane P. The recessed metal sections 66 are each formed of the flexible circuit metal layer 26, as by etching into or preferably through the metal layer and film layer 24 as well, and define recesses 68 configured to snugly receive the raised sections 52. The raised sections 52 interfit with the recesses 68 in recessed metal sections 66 in a manner to limit the movement between the load beam 16 and the flexible circuit 18, thus maintaining them in the desired predetermined alignment relation before and during the weld step so that errors in alignment are prevented and manufacturing losses from this source reduced or eliminated.

The invention method thus includes assembling in a predetermined alignment the load beam 16 and flexible circuit 18 of a disk drive suspension 10 having proximate end 12 and distal end 14 by juxtaposing at a common contact plane P—P, the load beam having longitudinal axis A—A and the flexible circuit having a coincident longitudinal axis. The method is self-aligning in that the load beam 16 and flexible circuit 18 will not fit together except as they are properly aligned with their male and female parts in registration. The method intersects longitudinally spaced first and second locator structures 36, 42 (male) on the load beam with longitudinally spaced third and fourth locator structures 38, 44 (female) on the flexible circuit across the common contact plane to locate the load beam and flexible circuit in the predetermined alignment, and thereafter fixes the load beam and flexible circuit together in the predetermined alignment by welding at distributed points 28.

The method includes extending the male first and second locator structures 36, 42 through the common plane P—P, and receiving these first and second locator structures within the female third and fourth locator structures 38, 44, respectively. The first and third locator structures 36, 38 are located at the suspension distal end 14. The second and fourth locator structures 42, 44 are located at the suspension proximate end 12.

In a preferred embodiment, the method includes intersecting fifth and sixth locator structures 46 (on the load beam 16) and 48 (on the flexible circuit 18) across the common contact plane P—P simultaneously with intersecting of the first through fourth locator structures 36, 42, 38, 44, the fifth and sixth locator structures being laterally offset as shown (and either left or right) from the longitudinal axes A—A of the load beam 16 and flexible circuit 18.

The several locator structure pairs 35, 41, and 45 are areally distributed, e.g. as shown, and sized to have the raised metal sections 52 closely interfit the opposing recesses 68. This close interfittment keeps the aligned load beam 16 and flexible circuit 18 from relative shifting before and during welding rendering expensive custom fixturing unnecessary.

The invention thus provides a disk drive suspension and a method for the assembly of disk drive suspension components in their proper alignment without use of machine vision, while maintaining the aligned parts free of relative movement until welded or otherwise fixed together by using components that are physically modified such that they will self-align solely by reference to themselves.

We claim:

1. A method of assembling in a predetermined alignment the load beam and flexible circuit components of a disk drive suspension having proximate and distal ends, including juxtaposing at a common contact plane a suspension load beam having a longitudinal axis and a flexible circuit having a longitudinal axis, said flexible circuit comprising a laminate of trace conductors, an insulative film and a metal support layer engaging said load beam in said contact plane, intersecting longitudinally spaced first and second locator structures on said load beam with longitudinally spaced third and fourth locator structures on said flexible circuit across said common contact plane to locate said load beam and flexible circuit in said predetermined alignment, and thereafter fixing said load beam and flexible circuit together in said predetermined alignment.

2. The assembly method according to claim 1, including also extending said first and second locator structures through said common plane, and receiving said first and second locator structures with said third and fourth locator structures respectively.

3. The assembly method according to claim 1, including also welding said flexible circuit metal layer to said load beam in locations spaced from said locator structures.

4. The assembly method according to claim 1, including also locating said first and second locator structures at said suspension distal end.

5. The assembly method according to claim 1, including also locating said third and fourth locator structures at said suspension proximate end.

6. The assembly method according to claim 5, including also locating said first and second locator structures at said suspension distal end.

7. The assembly method according to claim 6, including also forming in said load beam longitudinally spaced and axially aligned raised sections raised out of the general plane of said load beam.

8. The assembly method according to claim 7, including also orienting said raised load beam sections normal to the longitudinal axis of said load beam.

9. The assembly method according to claim 6, including also forming raised section receiving recesses in said flexible circuit metal layer to form said second and fourth locator structures.

10. The assembly method according to claim 1, including also selecting a stainless steel metal layer, and intersecting fifth and sixth locator structures on said load beam and flexible circuit respectively across said common contact plane simultaneously with intersecting of said first through fourth locator structures, said fifth and sixth locator structures being laterally offset from the longitudinal axes of said load beam and flexible circuit.

11. The assembly method according to claim 10, including also extending said first through sixth locator structures through said common plane, and receiving said first, second and fifth locator structures with said third, fourth and sixth locator structures respectively.

12. The assembly method according to claim 11, including also welding said flexible circuit metal layer to said load beam in locations spaced from said locator structures.

13. The assembly method according to claim 12, including also locating said first and third locator structure at said suspension distal end.

14. The assembly method according to claim 13, including also locating said second, fourth and fifth and sixth locator structures at said suspension proximate end.

15. The assembly method according to claim 6, including also forming in said load beam longitudinally spaced and axially aligned raised sections raised out of the general plane of said load beam as said first, second and fifth locator structures.

16. The assembly method according to claim 15, including also orienting said raised load beam sections of said first and third locator structures normal to the longitudinal axis of said load beam, and orienting said fifth locator structure parallel to said longitudinal axis.

17. The assembly method according to claim 16, including also forming raised section receiving recesses in said metal layer to form said second, fourth and sixth locator structures, said recesses extending through said metal layer, said fifth and sixth locators being paired and located between said first and second paired locators and said third and fourth paired locators.

* * * * *